Figure 1:
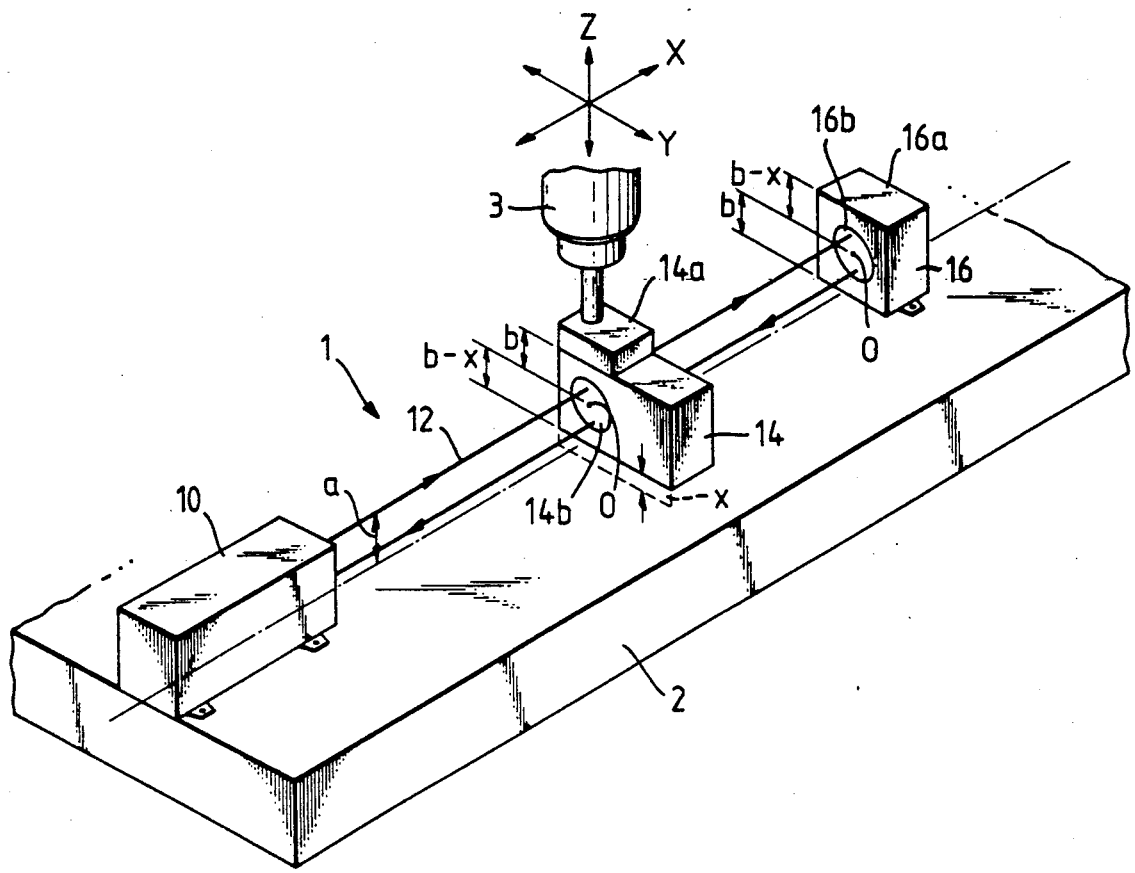

United States Patent [19]

Crownshaw

[11] Patent Number: 5,013,152
[45] Date of Patent: May 7, 1991

[54] INTERCHANGEABLE INTERFEROMETRIC OPTICAL MOUNTING ELEMENTS

[75] Inventor: John C. Crownshaw, Beverston, United Kingdom

[73] Assignee: Renishaw plc, Gloucestershire, United Kingdom

[21] Appl. No.: 362,455

[22] PCT Filed: Oct. 5, 1988

[86] PCT No.: PCT/GB88/00821

§ 371 Date: May 22, 1989

§ 102(e) Date: May 22, 1989

[87] PCT Pub. No.: WO89/03516

PCT Pub. Date: Apr. 20, 1989

[30] Foreign Application Priority Data

Oct. 12, 1987 [GB] United Kingdom ............... 8723902

[51] Int. Cl.$^5$ .................................................. G01B 9/02
[52] U.S. Cl. ................................... 356/345; 356/358
[58] Field of Search ............... 356/345, 356, 358, 359, 356/363

[56] References Cited

U.S. PATENT DOCUMENTS

| | | |
|---|---|---|
| 2,806,293 | 9/1957 | James et al. ..................... 356/345 |
| 2,880,644 | 4/1959 | Brockway et al. . |
| 3,409,375 | 11/1968 | Hubbard . |
| 3,486,824 | 12/1969 | Cook et al. . |
| 3,588,254 | 6/1971 | Rhoades . |
| 3,592,549 | 7/1971 | Hoffman . |

FOREIGN PATENT DOCUMENTS 2120401 11/1983 United Kingdom .

*Primary Examiner*—Samuel Turner
*Attorney, Agent, or Firm*—Oliff & Berridge

[57] ABSTRACT

For laser interferometer systems used for taking measurements on a machine, optical devices such as interferometers, reflectors and beam splitters are required to be mounted on the machine spindle or the machine bed. It is an advantage for some of the optical devices to be interchangeably mountable on the spindle or the bed to avoid duplication. The invention proposes that for interchangeability, a bed-mounted retro-reflector having the geometric center of its optical component positioned at a distance (b) from the side in contact with the machine bed, and (b-x) from the opposite side, while a spindle mounted interferometer has the geometric center of its optical component positioned at a distance (b-x) from the side confronting the bed (which is at a distance (x) from the bed) and at a distance (b) from the opposite side. Thus the geometric centers of the optical components are each at a distance (b) from the bed. The components can simply be interchanged between spindle-mounted and bed-mounted positions, by turning them through 180° and the geometric centers would still be at a distance (b) from the machine bed.

5 Claims, 1 Drawing Sheet

INTERCHANGEABLE INTERFEROMETRIC OPTICAL MOUNTING ELEMENTS

The present invention relates to optical devices for use in interferometric measuring systems.

The optical devices with which the invention is concerned are for example, linear and angular interferometers, retro-reflectors and beam splitters.

Interferometric measuring systems are used for measuring movements of parts of machines e.g. co-ordinate measuring machines and machine tools, for determining pitch, roll, yaw and linear errors of the movable machine parts as they move along the slide-ways of the machine.

In order to carry out the measurements a laser beam is directed towards the various optical devices disposed on the machine.

Depending on the machine type, the bed of the machine may be movable while the spindle remains fixed in position, or more generally the bed of the machine remains fixed while the spindle is capable of movement in three co-ordinate axes. Thus it can be seen that there is always relative movement between the spindle and the machine bed and it is this relative movement which is used to make the required measurements.

Since one of the optical components will always be mounted on the spindle there must always be a minimum clearance between the spindle-mounted optical component and the bed of the machine in order to enable the relative movement to take place.

In the conventional interferometric measuring systems the laser is mounted on a tripod and directs the laser beam across the bed of the machine at a height above the bed of the machine such as to provide adequate clearance between the spindle-mounted optical device and the bed of the machine. The optical device on the bed of the machine is mounted on a stand such that its centre is at an appropriate height to receive the laser beam after it has passed through the spindle-mounted optical device.

It would be an advantage to be able to mount the laser and some of the optical devices directly on the machine bed without packing pieces or stands. This would avoid the need for a bulky and expensive tripod, and would minimise the amount of time spent in aligning the laser beam and optical devices. It would also enable the measuring system to be left permanently in position to make measurements during an actual operation of the machine.

Conventional optical devices are made with square or rectangular housings to be interchangeable between spindle-mounted and bed-mounted positions to avoid mounting on the spindle or on a stand mounted on the machine bed to avoid creating devices for mounting at each of the two different positions. Thus, in order to align the laser beam through a conventional spindle-mounted optical device when the laser and the optical device are attached directly to the bed of the machine, that is, no stand is provided for the bed-mounted optical device, the spindle-mounted optical device would also need to be in contact with the bed of the machine in order to be in correct alignment with the laser beam. No relative movement could then take place between the spindle and the bed of the machine The present invention solves this problem in a simple and effective manner.

According to the present invention an optical device for use in an interferometric measuring system comprises a housing having two opposite sides and an optical component mounted within the housing characterised in that the geometric centre of the optical component is arranged to be closer to one of the sides of the housing than to the other.

Figure 2:
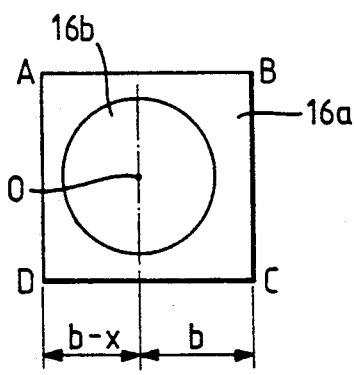
Figure 3:
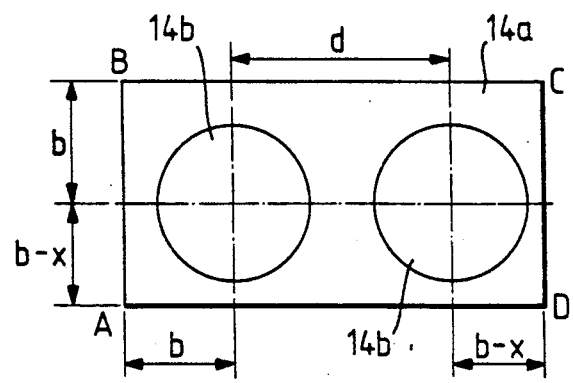

Examples of the invention will now be more particularly described with reference to the accompanying drawings in which, FIG. 1 illustrates diagramatically the components of a laser interferometer system of the present invention mounted on a machine bed, FIG. 2 illustrates one example of an optical device for use with the interferometer of FIG. 1, and FIG. 3 illustrates another example of an optical device for use with the interferometer of FIG. 1.

Referring now to the drawings in FIG. 1 there is shown part of a co-ordinate measuring machine 1 having a bed 2 on which a workpiece may be positioned and a spindle 3 mounted for movement along three orthogonal axes x, y and z over the bed. The construction of such machines is well known and is not described in detail.

Mounted directly onto the bed of the machine is a laser beam generator 10 which is arranged to direct a laser beam 12 over the bed of the machine towards optical devices 14,16 mounted respectively on the machine spindle 3 and on the machine bed 2. The optical devices each consist of a housing 14a, 16a containing an optical component 14b, 16b respectively.

The laser beam generator and the optical devices are matched so that the laser beam 12 directed at a height a above the machine bed impinges on the optical component at the appropriate position depending on the function of the optical device.

In the example illustrated, the optical device 14 is a linear interferometer and the optical device 16 is a retro-reflector. The laser beam is directed towards the interferometer 14 in which, in known manner, the beam is split to provide a reference beam within the interferometer and a measurement beam which is transmitted through the interferometer to the retro-reflector. The measurement beam is reflected back from the retro-reflector 16 through the interferometer 14 where it is re-combined with the reference beam and returned to a detector (not shown) on the laser to provide a measurement of the distance between the interferometer 14 and the retro-reflector 16. Thus when the spindle 3 moves relative to the machine bed 2, the distance moved can be determined by the interferometer.

For different measurements, different combinations of optical components are used, for example, for pitch and yaw measurements along the same axis, an angular interferometer will be mounted on the spindle in place of the linear interferometer. For measurements in an axis orthogonal to the laser beam an angular reflector would be mounted on the machine bed with the angular interferometer again on the machine spindle. Various combinations of beam splitters, reflectors and interferometers may be used to make measurements of pitch, yaw, roll and straightness errors on the machine as well as taking distance measurements.

The optical devices of the present invention are all constructed in accordance with the same principle, which is that the optical component 14b, 16b is mounted asymmetrically within its housing 14a, 16a. The arrangement is such that the optical centre o of the optical component is at a distance b from one side of the housing but at a distance b−x from the opposite side, where x is the clearance required between the housing and the bed of the machine to allow relative movement to take place between the two.

FIG. 2 shows a typical construction of a retro-relfector 16. Apart from the asymmetrical positioning of the optical component 16b within the housing 16a, the mounting is conventional. The housing 16a is substantially square having sides AB, BC, CD and DA, and the reflecting component itself 16b is a corner-cube the optical aperture of which is shown circular. However, the optical centre of the corner-cube, which is shown as the centre o of the circle is arranged to be nearer to side AD than to side BC by shortening the sides AB, CD. Thus when placed on the bed of the machine with side BC of the housing in contact with the bed, the optical centre of the component will be at a distance b from the bed. However, the same device can be mounted in the spindle of the machine with the side AD of the housing confronting the bed, and the spindle of the machine can be positioned so that the side AD of the housing is at a distance x from the bed of the machine. The optical centre of the optical component will still be at a distance b from the bed of the machine however because of the shorter distance b−x of the optical centre of the component from the side AD of the housing.

In this way the optical device can either be mounted on the machine spindle, and have clearance from the machine bed for the relative movement there between to take place, or can be mounted on the bed of the machine with the optical centre of the component at the same height b from the bed of the machine, without the need for additional packing pieces or shims, simply by rotating the housing by 180° between the two positions.

Where the optical device may also be used standing on its sides AB and DC and is required to be interchangeable between spindle-mounted and bed-mounted positions, as may be the case with a beam splitter, the same asymmetric mounting arrangement may be used with the optical centre of the component arranged to be a distance b from side AB and a distance b−x from side DC.

Similarly where the device includes two optical components, for example, an angular reflector or angular interferometer for taking pitch measurement, as shown in FIG. 3, the optical centres of both of the optical components may be arranged to be at a distance b from one of the long sides BC of the rectangular housing and at a distance b−x from the opposite side AD. If the device is required to be used either horizontally or vertically, then in addition the centres of the two optical components can be arranged to be b and b+d from one of the short sides AB of the rectangular housing, and at a distance b−x and b+d−x from the other side DC of the housing as shown in FIG. 3.

Thus it can be seen that by mounting the optical devices of an interferometric measuring system in asymmetric manner as described above, it is possible to use them interchangeably as spindle-mounted or bed-mounted optical devices, while at the same time placing the laser and bed-mounted optical devices directly on the bed of the machine. Hence a laser interferometer system using optical devices of the present invention may be used with a bed mounted laser without the need for additional stands or packing pieces for the optical devices, or may be used in conventional manner with a tripod-mounted laser, without the need for any other modifications to the optical devices.

I claim:

1. An optical device for use in interferometric measuring systems comprising:
    an optical component, said optical component having a geometric center; and
    a housing, said optical component mounted in said housing such that said geometric center is asymmetrically positioned with respect to at least a first side and an opposing second side of said housing, said asymmetrically positioned geometric center being closer to said first side by a clearance distance and at a fixed distance from said second side such that by proper orientation said optical device may be mounted on one of a moving part and a stationary part in a manner permitting a light beam passing at said fixed distance from a bed of a machine to pass through said geometric center and said moving part may move without hinderance.

2. An optical device claimed in claim 1, wherein said moving and stationary parts are either one of a spindle and a machine bed, said optical component when mounted to either one of said spindle and said machine bed is mounted by said second side of said housing.

3. An optical device as claimed in claim 1, wherein said housing further comprises a third side and an opposing fourth side, said third and fourth side orthogonal to said first and second sides, said geometric center asymmetrical positioned with respect to said third side and said opposing fourth side being closer to said third side by said clearance distance and at said fixed distance from said fourth side.

4. An optical device for use on a machine having a movable part and a fixed part, said device comprising an optical component having a geometric center and mounted asymmetrically in a housing, said device being capable of being mounted in a first orientation on a first one of the parts in a position confronting the other part with a clearance therebetween and with said geometric center of the optical component at a pre-determined distance from said other one of the parts, and further wherein said device is also capable of being mounted in a second orientation directly on said other one of the parts of the machine with the geometric center of the optical component at the same pre-determined distance therefrom.

5. An optical measuring system for use with a machine having a movable part and a fixed part which are relatively moveable, said system comprising a light source mounted on the fixed part of the machine and which produces a light beam at a pre-determined fixed distance from the fixed part of the machine, an optical device comprising an optical component having a geometric center and mounted asymmetrically within a housing, said device being mountable in a first orientation on the movable pat with clearance from the fixed part and with the geometric center of the optical component aligned with the light beam, said device also being mountable directly on the fixed part in a second orientation with the geometric center of the optical component aligned with the light beam.

* * * * *